United States Patent
Okushita et al.

(10) Patent No.: US 6,767,988 B2
(45) Date of Patent: Jul. 27, 2004

(54) POLYAMIDE ELASTOMER

(75) Inventors: Hiroshi Okushita, Ube (JP); Tadao Muramatsu, Ube (JP)

(73) Assignee: UBE Industries, Ltd., Yamaguchi (JP)

( * ) Notice: Subject to any disclaimer, the term of this patent is extended or adjusted under 35 U.S.C. 154(b) by 0 days.

(21) Appl. No.: 10/127,582

(22) Filed: Apr. 23, 2002

(65) Prior Publication Data

US 2002/0183480 A1 Dec. 5, 2002

(30) Foreign Application Priority Data

Apr. 23, 2001 (JP) .......................... 2001-123839
Mar. 5, 2002 (JP) .......................... 2002-059283

(51) Int. Cl.$^7$ .......................... C08G 63/44; C08G 69/00; C08G 69/02; C08F 283/04
(52) U.S. Cl. .......................... 528/310; 528/170; 528/335; 528/322; 528/332; 528/323; 525/420; 525/433; 525/435; 525/439; 525/462; 525/467
(58) Field of Search .......................... 528/310, 170, 528/322, 332, 323, 335; 525/420, 433, 435, 439, 462, 467, 466

(56) References Cited

U.S. PATENT DOCUMENTS

| | | | |
|---|---|---|---|
| 4,328,331 A | 5/1982 | Chen et al. | |
| 4,331,786 A | 5/1982 | Foy et al. | |
| 4,649,180 A | 3/1987 | Chen et al. | |
| 4,663,428 A | 5/1987 | Okitu et al. | |
| 4,673,727 A | 6/1987 | Miller, Jr. | |
| 5,173,543 A | 12/1992 | Bott et al. | |
| 6,297,345 B1 * | 10/2001 | Okushita et al. | ............ 528/170 |

FOREIGN PATENT DOCUMENTS

JP   10-292037   * 11/1998

OTHER PUBLICATIONS

European Search Report, Application No. 02008289.7–2115, Mailing Date: Aug. 9, 2002.

* cited by examiner

Primary Examiner—P. Hampton Hightower
(74) Attorney, Agent, or Firm—Nixon Peabody LLP; Jeffrey L. Costellia

(57) ABSTRACT

Polyamide elastomer comprising a hard segment derived from polyamide having no divalent aromatic group and a soft segment derived from polycarbonate diol having no divalent aromatic group has high flexibility and high heat resistance in addition to good physical characteristics of the known polyamide elastomers.

7 Claims, No Drawings

POLYAMIDE ELASTOMER

FIELD OF THE INVENTION

This invention relates to polyamide elastomer having high flexibility and high heat resistance in addition to good physical characteristics of the known polyamide elastomers.

BACKGROUND OF THE INVENTION

It is well known that polyamide elastomers comprising hard segments derived from polyamide and soft segments derived from polyethers has good physical characteristics such as high impact-recovery resilience, and low temperature flexibility. For instance, U.S. Pat. No. 4,331,786 describes polyether-ester-amide block copolymer.

However, the known polyamide elastomers having hard segments of polyamide and soft segment of polyether has disadvantageous characteristics such as low heat resistance and noticeable yellowing.

Japanese Patent Provisional Publication 8-134210 describes polyamide elastomer comprising hard segments derived from aromatic amides and soft segments derived from aliphatic polyesters, aliphatic polycarbonates, aliphatic polyether carbonate, or polyorganosiloxane and having a weight average molecular weight of 30,000 to 1,000,000.

SUMMARY OF THE INVENTION

It is an object of the invention to provide a polyamide elastomer having high flexibility and high heat resistance in addition to good physical characteristics of the known polyamide elastomers.

The present invention resides in polyamide elastomer comprising units derived from polyamide-forming monomers having no divalent aromatic group, units derived from polycarbonate diols, and units derived from dicarboxylic acids.

The invention further resides in polyamide elastomer comprising units derived from aliphatic polyamides having a carboxylic acid group at each end thereof, and units derived from polycarbonate diols.

The invention furthermore resides in polyamide elastomer comprising aliphatic polyamide units in an amount of 15 to 95 weight %, polycarbonate diol units, and dicarboxylic acid units.

DETAILED DESCRIPTION OF THE INVENTION

The polyamide elastomer of the invention is prepared from (A) polyamide-forming monomers having no divalent aromatic group, (B) polycarbonate diols, and (C) dicarboxylic acids. The polyamide-forming monomer is preferably employed in an amount of 15 to 95 wt. %, more preferably 20 to 93 wt. %, more preferably 25 to 92 wt. %, and most preferably 30 to 90 wt. %.

The polycarbonate diol is preferably employed in an amount of 15 to 90 weight %. The polycarbonate diol and dicarboxylic acid are preferably employed in such amounts that the amount of hydroxyl groups of the polycarbonate diol and the amount of carboxyl groups of the dicarboxylic acid are equal to each other with respect to molar amount.

The polyamide-forming monomer having no divalent aromatic group, namely (A), preferably is an aliphatic polyamide-forming monomer. The aliphatic polyamide-forming monomer preferably has the following formula (1) or (4):

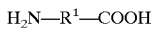

$$H_2N-R^1-COOH \quad (1)$$

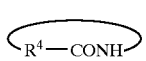

(4)

in which $R^1$ is an aliphatic hydrocarbon chain having 2 to 20 carbon atoms, preferably 3 to 18 carbon atoms, more preferably 4 to 15 carbon atoms, most preferably 10 to 15 carbon atoms, and $R^4$ is an aliphatic hydrocarbon chain having 3 to 20 carbon atoms, preferably 3 to 18 carbon atoms, more preferably 4 to 15 carbon atoms, most preferably 10 to 15 carbon atoms. It is specifically preferred that each of $R^1$ and $R^4$ has 11 carbon atoms.

Examples of the preferred polyamide-forming monomers include ω-aminocarboxylic acid, lactam, reaction products of diamine and dicarboxylic acid, and reaction products of ω-aminocarboxylic acid and dicarboxylic acid.

The diamine preferably is an aliphatic diamine or its derivative. The dicarboxylic acid preferably is an aliphatic dicarboxylic acid or its derivative. A molar ratio of diamine to dicarboxylic acid (diamine/dicarboxylic acid) preferably is in the range of 0.9 to 1.1, more preferably 0.93 to 1.07, more preferably 0.95 to 1.05, most preferably 0.97 to 1.03.

The diamine preferably is an aliphatic diamine having 2 to 20 carbon atoms. Examples of the diamines include ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, and 3-methylpentamethylene diamine.

The dicarboxylic acid preferably is an aliphatic dicarboxylic acid having 2 to 20 carbon atoms. Examples of the dicarboxylic acids include oxalic acid, succinic acid, glutaric acid, adipic acid, pimelic acid, suberic acid, azelaic acid, sebacic acid, and dodecane diacid.

The lactam preferably is an aliphatic lactam having 5 to 20 carbon atoms. Examples of the lactams include ε-caprolactam, ω-enantholactam, ω-undecalactam, ω-dodecalactam, and 2-pyrrolidone.

The ω-aminocarboxylic acid preferably is an aliphatic ω-aminocarboxylic having 5 to 20 carbon atoms. Examples of the ω-aminocarboxylic acids include 6-aminocaproic acid, 7-aminoheptanoic acid, 8-aminooctanoic acid, 10-aminocaprilic acid, 11-aminoundecanoic acid and 12-amino-dodecanoic acid.

The polycarbonate diols (B) preferably has the following formula (2):

$$HO-[-R^2-OCOO-]_n-R^2-OH \quad (2)$$

in which $R^2$ is an aliphatic hydrocarbon chain having 2 to 12 carbon atoms or a molecular chain comprising an alicyclic group having 5 to 12 carbon atoms and an aliphatic hydrocarbon group having 2 to 60 carbon atoms.

Preferably, $R^2$ is an aliphatic hydrocarbon chain having 3 to 12 carbon atoms (more preferably 4 to 12 carbon atoms, more preferably 4 to 10 carbon atoms, most preferably 5 to 8 carbon atoms), or a molecular chain comprising an alicyclic group having 5 to 12 carbon atoms and an aliphatic hydrocarbon group having 3 to 12 carbon atoms (more preferably 4 to 12 carbon atoms, more preferably 4 to 10 carbon atoms, most preferably 5 to 8 carbon atoms). $R^2$ preferably is a saturated hydrocarbon chain.

Preferably, n is a number of 3 to 30 (more preferably 4 to 20, most preferably 5 to 15).

Examples of the polycarbonate diols include the following compounds:

polycarbonate diol prepared by the transesterification reaction of an alkane diol with dimethyl carbonate, diethyl carbonate or diphenyl carbonate; and polycarbonate diol prepared from an alkane diol and phosgene by surface polycondensation reaction.

Examples of the alkane diols include ethylene glycol, propylene glycol, 1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, 1,11-undecanediol, 1,12-dodecanediol, and cyclohexane 1,4-dimethanol.

The dicarboxylic acid (C) preferably has the following formula (3):

$$HOOC\text{—}(R^3)_m\text{—}COOH \quad (3)$$

in which $R^3$ is an aliphatic hydrocarbon chain having 1 to 25 carbon atoms or a molecular chain comprising an alicyclic group having 5 to 20 carbon atoms and an aliphatic hydrocarbon group having 1 to 25 carbon atoms, and m is 0 or 1. Preferably m is 1.

Preferably, $R^3$ is an aliphatic hydrocarbon chain having 1 to 20 carbon atoms (more preferably 2 to 15 carbon atoms, most preferably 4 to 10 carbon atoms) or a molecular chain comprising an alicyclic group having 5 to 20 carbon atoms and an aliphatic hydrocarbon group having 1 to 20 carbon atoms (more preferably 2 to 15 carbon atoms, most preferably 4 to 10 carbon atoms).

It is preferred that the dicarboxylic acid (C) is an aliphatic or alicyclic dicarboxylic acid, or one of their derivatives. Preferably, the dicarboxylic acid is a linear aliphatic dicarboxylic acid having 2 to 25 carbon atoms. Examples of the dicarboxylic acids include oxalic acid, succinic acid, glutaric acid, adipic acid, pimelic acid, suberic acid, azelaic acid, sebacic acid, and dodecane diacid. A dimerized aliphatic dicarboxylic acid (i.e., dimer acid) having 2 to 500 carbon atoms which is produced by dimerization of an unsaturated fatty acid obtainable by fractional distillation of triglyceride or its hydrogenated product (i.e., hydrogenated dimer acid) can be also employed. Moreover, an alicyclic dicarboxylic acid such as 1,4-cyclohexanedicarboxylic acid is also employable. The dimer acids and hydrogenated dimer acid can be available on the market from Unichema Corporation under the tradenames of Pripol 1004, Pripol 1006, Pripol 1009, and Pripol 1013.

The polyamide elastomer of the invention can be produced by melt polymerization of the polyamide-forming monomers having no divalent aromatic group, polycarbonate diols, and dicarboxylic acids. The melt polymerization is preferably carried out by a combination of a first melt polymerization under an atmospheric or increased pressure and a second melt polymerization under reduced pressure. The polyamide-forming monomer, polycarbonate diol, and dicarboxylic acid can be placed simultaneously in a reaction vessel. Otherwise, the polyamide-forming monomer and dicarboxylic acid are first reacted to prepare a polyamide having carboxylic acid group at its each end (or terminal), and subsequently the prepared polyamide is then reacted with the polycarbonate diol.

The polymerization can be carried out at a temperature of 150 to 300° C., preferably 160 to 280° C., more preferably 170 to 260° C., most preferably 180 to 250° C.

In the case that ω-aminocarboxylic acid (polyamide-forming monomer), polycarbonate diol and dicarboxylic acid are simultaneously placed in a reaction vessel, a successive process comprising a melting polymerization procedure under atmospheric pressure and a melt procedure under reduced pressure is performed. In the case that lactam or a combination of diamine and dicarboxylic acid or their salt (polyamide-forming monomer), polycarbonate diol and dicarboxylic acid are simultaneously placed in a reaction vessel, a successive process comprising a melting polymerization procedure under pressure (0.1 to 3 MPa) in the presence of an appropriate water and a melt procedure under reduced pressure is performed.

In the case that ω-aminocarboxylic acid (polyamide-forming monomer) and dicarboxylic acid are first reacted to produce a polyamide or polyamide oligomer having a carboxyl group at each end, the reaction is performed under atmospheric pressure. In the case that lactam or a combination of diamine and dicarboxylic acid or their salt (polyamide-forming monomer) and dicarboxylic acid are first reacted to produce a polyamide or polyamide oligomer having a carboxyl group at each end, the reaction is performed under pressure.

In the reaction procedure under atmospheric pressure or increased pressure, the amide-forming reaction mainly proceeds. Whereas, in the reaction procedure under reduced pressure, the esterification reaction mainly proceeds to give the desired polyamide elastomer.

In the esterification reaction, a known esterification catalyst can be utilized. Examples of the esterification catalysts include lithium acetate, zinc acetate, magnesium acetate, magnesium oxide, titanium (IV) chloride, zirconium (IV) chloride, hafnium (IV) chloride, tin (IV) chloride, tetramethyl titanate, tetraethyl titanate, tetrapropyl titanate, tetraisopropyl titanate, tetrabutyl titanate, tetrabutyl zirconate, distanoxanes such as 1-hydroxy-3-isothiocyanate-1,1,3,3-tetrabutyldistanoxane, diphenylammonium trifurate, and hafnium (IV) chloride-tetrahydrofuran. The catalyst is preferably utilized in an amount of 10 to 10,000 ppm, based on the total amount of the starting materials.

The reaction for producing the polyamide elastomer of the invention generally is performed for 0.5 to 30 hours.

The above-mentioned reaction gives the desired polyamide elastomer having a relative viscosity of 1.2 to 3.5 (0.5 wt./vol. %, metacresol solution, 25° C.). If desired, a solid polymerization reaction is then performed for producing an elastomer having an increased viscosity. The solid polymerization reaction can be performed at a temperature of not lower than 100° C,. but not higher than the melting point of the resulting elastomer. The solid polymerization reaction is generally performed for 1 to 50 hours.

The polyamide elastomer of the invention preferably has a relative viscosity (ηr) in the range of 1.2 to 3.5, preferably 1.3 to 3.0, more preferably 1.35 to 2.5, most preferably 1.4 to 2.2 (0.5 wt./vol. %, metacresol solution, 25° C.).

The polyamide elastomer of the invention can be produced either by a batch system or by a continuous system. The reaction vessel can be a batch reaction vessel, a continuous single or multiple vessel reaction apparatus, or a continuous tubular reaction apparatus. These reaction vessels can be employed singly or in combination.

If desired, the polymerization reaction can be carried out in the presence of a polymerization accelerator or an oxidation inhibitor such as an inorganic phosphate compound, for example, phosphoric acid, phosphorous acid, hypophosphilic acid, pyrophosphoric acid, their alkali metal salts, or their alkaline earth metal salt, in an amount of 50 to 3,000 ppm, based on the total amount of the starting materials. A monoamine compound (e.g., lauryl amine or stearyl amine), a diamine compound (e.g., hexamethylene diamine or metaxylylenediamine), a monocarboxylic acid (e.g., benzoic acid or stearic acid), or a dicarboxylic acid (e.g., isophthalic acid or terephthalic acid) can be used for controlling the molecular weight of the resulting elastomer, or stabilizing the viscosity of melted elastomer in the molding procedure. The amount of the additive can be so adjusted that the resulting elastomer can have a relative viscosity in the aforementioned range.

The polyamide elastomer of the invention can contain heat resistance-increasing agents, UV absorbers, photostabilizers, oxidation inhibitors, antistatic agents, lubricants, slipping agents, crystallization nucleus-forming agents, tackiness intensifiers, sealing improvers, anti-fogging agents, releasing agents, plasticizers, pigments, dyes, perfumers, flame retarders, or reinforcing agents.

The polyamide elastomer of the invention can be easily molded to give a product having high flexibility, appropriate impact-recovery resilience, high heat resistance, and high yellowing resistance. Examples of the molded products include injected products, tubes, pipes, shaped sections, sheets, films, monofilaments, and fibers.

The polyamide elastomer of the invention is well compatible with other polyamide resins. Accordingly, the polyamide elastomer can be blended with other polyamide resins or laminated on other polyamide resin sheets. For instance, the polyamide elastomer of the invention can be blended with other polyamide resin to give polyamide resins having improved impact resistance, elasticity and flexibility.

The polyamide elastomer of the invention preferably has a stress relaxation just after molding of 2.5 or more, more preferably 2.8 or more, more preferably in the range of 2.8 to 12, and most preferably 3 to 8. The polyamide elastomer preferably shows a ratio of decrease of stress relaxation $t_b/t_a$ ($t_a$ means a stress relaxation just after molding, and $t_b$ means a stress relaxation after 30 day storage at 100° C.) of 0.6 or more, more preferably 0.7 or more, more preferably in the range of 0.7 to 0.95, and most preferably in the range of 0.7 to 0.9.

The polyamide elastomer of the invention preferably shows a value of $Y_a$ [yellowness index (YI) just after molding] of 9.5 or less, more preferably 9.2 or less, more preferably 9 or less, and most preferably 8.8 or less. The polyamide elastomer preferably shows a value of $(Y_b-Y_a)$ [$Y_b$ means a yellowness index (YI) after 60 day storage at 50° C.] of 25 or less, more preferably 20 or less, more preferably 18 or less, and most preferably 17 or less. The polyamide elastomer preferably shows a value of $(Y_c-Y_a)$ [$Y_c$ means a yellowness index (YI) after 60 day storage at 80° C.] of 80 or less, more preferably 60 or less, more preferably 50 or less, and most preferably 40 or less. The polyamide elastomer preferably shows a value of $(Y_c/Y_a)$ of 10 or less, more preferably 9 or less, more preferably 8 or less, and most preferably 7.5 or less.

The polyamide elastomer of the invention preferably shows a coefficient of stretch recovery just after molding of 78% or more, more preferably 80% or more, more preferably 81% or more, and most preferably 82% or more.

The polyamide elastomer of the invention preferably has an elasticity just after molding of 205 MPa or less, more preferably 202 MPa or less, more preferably 200 MPa or less, and most preferably in the range of 50 to 200 MPa.

The polyamide elastomer of the invention preferably has a tensile stress at breakdown point just after molding of 18 MPa or less, more preferably 17 MPa or less, more preferably 16 MPa or less, and most preferably in the range of 5 to 15 MPa. The polyamide elastomer has a tensile stress at breakdown point after 30 day storage at 100° C. of 18 MPa or less, more preferably 17 MPa or less, more preferably 16 MPa or less, and most preferably in the range of 5 to 15 MPa.

The polyamide elastomer of the invention preferably has a breakdown extension just after molding of 200% or more, more preferably 300% or more, more preferably 400% or more, and most preferably 450% or more. The polyamide elastomer of the invention preferably has a breakdown extension after 30 day storage at 100° C. of 200% or more, more preferably 300% or more, more preferably 350% or more, and most preferably 400% or more.

The present invention is further described by the following non-limiting examples.

The characteristics are determined by the following methods.

1) Relative viscosity ($\eta r$), 0.5 wt./vol. %, metacresol solution, at 25° C.): measured at 25° C. by means of the Ostwald viscometer in m-cresol (guaranteed reagent) at 5 g/dm³ concentration).

2) Terminal carboxyl group concentration ([COOH]): the elastomer (1 g) is dissolved in 40 mL of benzyl alcohol, by heating in nitrogen gas atmosphere, and the terminal carboxyl group concentration is measured by titration with N/20 potassium hydroxide-ethanol solution using phenolphthalein as indicator.

3) Terminal amino group concentration ([NH$_2$]): the elastomer (1 g) is dissolved in 40 mL of phenol/methanol mixture (9/1, volume ratio), and the terminal amino group concentration is measured by titration with N/20 hydrochloric acid using thymol blue as indicator.

4) Number average molecular weight (Mn): determined from the terminal carboxyl group concentration [COOH] and the terminal amino group concentration [NH$_2$] according to the following equation (1):

$$Mn=2/\{[NH_2]+[COOH]\} \qquad (1)$$

5) Melting point (Tm) and Temperature of crystallization (Tc): measured by means of a differential scanning calorimeter (DSC-50, available from Shimazu Seisakusho, Co., Ltd.) under nitrogen gas atmosphere. For the measurements, the elastomer is heated from room temperature to 230° C. at a rate of 10° C./min.,—first temperature increase run—, maintained at 230° C. for 10 min., cooled to −100° C. at a rate of 10° C./min.,—first temperature decrease run—, and then heated to 230° C. at a rate of 10° C./min.,—second temperature increase run.

From the obtained DCS chart, Tc corresponding to the exothermic peak temperature in the first temperature decrease run and Tm corresponding to the endothermic peak temperature in the second temperature increase run are determined.

6) Composition: The elastomer is dissolved in heavy trifluoroacetate at a concentration of 4 wt. %. The elastomer solution is subjected to proton NMR spectroscopy at room temperature using JNM-EX 400 WB-type FT-NMR (available Japan Electronics Co., Ltd.). From the NMR spectrum, the composition of the constituting monomer components is determined.

7) Stress relaxation: The elastomer is molded under compression to prepare an elastomer film (thickness: approximately 100 μm). The elastomer film is cut out to give a dumb-bell type test specimen (corresponding to JIS No.3). The specimen is fitted in a pair of chucks of a tensile strength tester at a space of 50 mm. The specimen is then extended at a rate of 500 mm/min at 23° C. When the 0.4 mm long portion (2% of the total strength) at the center of the specimen is extended, the variation of relaxation is measured while maintaining the condition. A period of time required for varying a ratio of $\sigma_t/\sigma_o$ [$\sigma_o$ means an initial stress at the 2% extension, and $\sigma_t$ means a stress at a lapse of time t] to reach 0.9 ($t_{0.9}$) is determined. A larger $t_{0.9}$ means that the relaxation is lower and the rubber elasticity is better.

8) Coefficient of extension recovery: The elastomer is molded under compression to prepare an elastomer film (thickness: approximately 100 μm). The elastomer film is cut out to give a dumb-bell type test specimen (corresponding to JIS No.3). The specimen is fitted in a pair of chucks of a tensile strength tester at a space of 50 mm. The specimen is then extended at a rate of 100 mm/min at 23° C. When the 4 mm long portion (20% of the total strength) at the center of the specimen is extended, the extension is relieved at the same rate to give the stress of zero (0). The distance between the chucks (r mm) is measured when the stress reaches zero. The coefficient of extension recovery is then calculated according to the following equation (1).

$$\text{Coefficient of extension recovery (\%)} = [4-(r-50)]/4 \times 100 \quad (2)$$

A larger coefficient of extension recovery corresponds to better rubber elasticity.

9) Extension properties: The elastomer is molded under compression to prepare an elastomer film (thickness: approximately 100 μm). The elastomer film is cut out to give a specimen (100 mm×10 mm). The specimen is subjected to extension test under the condition of a chuck distance of 50 mm and an extension rate of 500 mm/min. at 23° C., to cause breakdown. In this test, an elasticity, a tensile stress at breakdown point, and a breakdown extension.

10) Heat resistance: The elastomer is molded under compression to prepare an elastomer film (thickness: approximately 100 μm). The elastomer film is heated for 30 days in an over maintained at 100° C. After the heat treatment, the elastomer film is subjected to the measurements of $t_{0.9}$, coefficient of extension recovery, and extension property, in the aforementioned manner.

11) Resistance to yellowing: The elastomer is molded under compression to prepare an elastomer film (thickness: approximately 100 μm). The elastomer film is heated for 60 days in an over maintained at 50° C. or 80° C. The heat treated film is subjected to measurement of a yellowness index (YI) using an SM-5-1S-2B (SM color computer available from Suga Test Machine Co., Ltd.). The value of YI is processed to express YI of 1 mm thick film.

EXAMPLE 1

In a reaction vessel equipped with a stirrer and a nitrogen gas inlet were placed 25.000 weight parts of 12-aminododecanoic acid and 3.190 weight parts of adipic acid. The inner space of the vessel was purged using nitrogen gas. The content of the vessel was heated to 200° C. for one hour under the condition that a nitrogen gas was passed at a flow rate of 50 mL/min. The temperature of the content was then increased to 240° C. for one hour, and the content was continuously heated at 240° C. for 4 hours. Thus, polymerization was complete. The polymerization product was a polyamide 12 oligomer having a carboxyl group at each end: end group concentrations [COOH]=167.28×10$^{-5}$ eq/g and [NH$_2$]=0 eq/g, number average molecular weight (Mn)=1195.6.

In a reaction vessel equipped with a stirrer and a nitrogen gas inlet were placed 16.316 weight parts of the polyamide 12 oligomer, 13.825 weight parts of polycarbonate diol (HO—(—(CH$_2$)$_6$OCOO—)$_{6.1}$—(CH$_2$)$_6$OH, ETERNACOLL H100 available from Ube Industries, Ltd.), and 0.1 weight part of tetrabutyl titanate. The inner space of the vessel was purged using nitrogen gas. The content of the vessel was heated to 210° C. for 3 hrs. under the condition that a nitrogen gas was passed at a flow rate of 50 mL/min. The inner pressure of the vessel was gradually reduced for one hour to reach approximately 30 Pa. Under the condition, the content was subjected to polymerization for 2 hrs. The inner space of the vessel was then heated and evacuated for 30 minutes to reach 230° C. and approximately 10 Pa. The content was further subjected to reaction at the same temperature and pressure for 2 hours. Thus, reaction was complete.

The polymerization product was a white flexible, tough polymer having ηr=1.50, Tm=151.1° C., and Tc=111.8° C. The polymer composition was expressed by PA12/PCD/AA=48.3/46.5/5.2 (wt. %, PA12 means a polyamide 12 unit, PCD means a polycarbonate diol unit, and AA means an adipic acid unit).

The polymerization product was then mixed with 1,000 ppm of an oxidation inhibitor (Tominox 917, available from Yoshitomi Pharmaceutical Co., Ltd.). The mixture was molded under compression at 230° C. and 10 MPa, to produce a polyamide elastomer film having a thickness of approximately 100 μm.

The polyimide elastomer film was subjected to measurements of $t_{0.9}$, coefficient of extension recovery, extension properties, and yellowness index, just after molding and after heat treatment. The measurement data are set forth in Table 1.

EXAMPLE 2

In a reaction vessel equipped with a stirrer and a nitrogen gas inlet were placed 66.024 weight parts of 12-aminododecanoic acid and 4.483 weight parts of adipic acid. The inner space of the vessel was purged using nitrogen gas. The content of the vessel was heated to 200° C. for one hour under the condition that a nitrogen gas was passed at a flow rate of 50 mL/min. The temperature of the content was then increased to 240° C. for one hour, and the content was continuously heated at 240° C. for 3 hours. Thus, polymerization was complete. The polymerization product was a polyamide 12 oligomer having a carboxyl group at each end: end group concentrations [COOH]=105.66×10$^{-5}$ eq/g and [NH$_2$]=0.10×10$^{-5}$ eq/g, number average molecular weight (Mn)=1891.1.

In a reaction vessel equipped with a stirrer and a nitrogen gas inlet were placed 19.735 weight parts of the polyamide 12 oligomer, 10.542 weight parts of polycarbonate diol (HO—(—(CH$_2$)$_6$OCOO—)$_{6.1}$—(CH$_2$)$_6$OH, ETERNACOLL H100), and 0.1 weight part of tetrabutyl titanate. The inner space of the vessel was purged using nitrogen gas. The content of the vessel was heated to 210° C. for 3 hrs. under the condition that a nitrogen gas was passed at a flow rate of 50 mL/min. The inner pressure of the vessel was gradually reduced for 30 minutes to reach approximately 10 Pa. Under the condition, the content was subjected to polymerization for 2.5 hrs. The inner space of the vessel was then heated and evacuated for 30 minutes to reach 230° C. and approximately 5 Pa. The content was further subjected to reaction at the same temperature and pressure for 1.25 hours. Thus, reaction was complete.

The polymerization product was a white flexible, tough polymer having ηr=1.61, Tm=163.1° C., and Tc=130.5° C. The polymer composition was expressed by PA12/PCD/AA=54.9/40.6/4.5 (wt. %).

The polymerization product was then mixed with 1,000 ppm of an oxidation inhibitor (Tominox 917). The mixture was molded under compression at 230° C. and 10 MPa, to produce a polyamide elastomer film having a thickness of approximately 100 μm.

The polyimide elastomer film was subjected to measurements of $T_{0.9}$, coefficient of extension recovery, extension properties, and yellowness index, just after molding and after heat treatment. The measurement data are set forth in Table 1.

EXAMPLE 3

In a reaction vessel equipped with a stirrer and a nitrogen gas inlet were placed 35.000 weight parts of 12-aminododecanoic acid and 3.422 weight parts of adipic acid. The inner space of the vessel was purged using nitrogen gas. The content of the vessel was heated to 200° C. for one hour under the condition that a nitrogen gas was passed at a flow rate of 50 mL/min. The temperature of the content was then increased to 240° C. for one hour, and the content was continuously heated at 240° C. for 4 hours. Thus, polymerization was complete. The polymerization product was a polyamide 12 oligomer having a carboxyl group at each end: end group concentrations [COOH]=132.00×10$^{-5}$ eq/g and [NH$_2$]=0 eq/g, number average molecular weight (Mn)=1515.2.

In a reaction vessel equipped with a stirrer and a nitrogen gas inlet were placed 18.003 weight parts of the polyamide 12 oligomer, 12.042 weight parts of polycarbonate diol (HO—(—(CH$_2$)$_6$OCOO—)$_{6.1}$—(CH$_2$)$_6$OH, ETERNACOLL H100), and 0.1 weight part of tetrabutyl titanate. The inner space of the vessel was purged using nitrogen gas. The content of the vessel was heated to 200° C. for one hour under the condition that a nitrogen gas was passed at a flow rate of 50 mL/min. The content was further heated to 220° C. for 20 minutes, and further heated at the same temperature for one hour. The inner pressure of the vessel was reduced for 30 minutes to reach approximately 5 Pa. Under the condition, the content was subjected to polymerization for 2.5 hrs. The inner space of the vessel was then heated and evacuated for 30 minutes to reach 230° C. and approximately 5 Pa. The content was further subjected to reaction at the same temperature and pressure for 1.5 hours. Subsequently, the inner space of the reaction vessel was heated and evacuated to 230° C. and approx. 3 Pa. Under the condition, the reaction was carried out for 2.2 hours, and then the reaction was complete.

The polymerization product was a white flexible, tough polymer having ηr=1.83. The polymer composition was expressed by PA12/PCD/AA=60.9/35.2/3.9 (wt. %).

The polymerization product was then mixed with 1,000 ppm of an oxidation inhibitor (Tominox 917). The mixture was molded under compression at 230° C. and 10 MPa, to produce a polyamide elastomer film having a thickness of approximately 100 μm.

The polyimide elastomer film was subjected to measurements of $T_{0.9}$, coefficient of extension recovery, extension properties, and yellowness index, just after molding and after heat treatment. The measurement data are set forth in Table 1.

EXAMPLE 4

In a reaction vessel equipped with a stirrer and a nitrogen gas inlet were placed 15.006 weight parts of 12-aminododecanoic acid, 14.021 weight parts of polycarbonate diol (HO—(—(CH$_2$)$_6$OCOO—)$_{13.1}$—(CH$_2$)$_6$OH, ETERNACOLL H200, available from Ube Industries, Ltd.), and 1.022 weight parts of adipic acid. The inner space of the vessel was purged using nitrogen gas. The content of the vessel was heated to 200° C. for 2 hrs. under the condition that a nitrogen gas was passed at a flow rate of 50 mL/min. The temperature of the content was then increased to 220° C. for one hour, and the content was continuously heated for 2 hours. The inner pressure of the vessel was reduced for 30 minutes to reach approximately 7 Pa. Under the condition, the content was subjected to polymerization for 1.5 hrs. The inner space of the vessel was then heated and evacuated for 30 minutes to reach 230° C. and approximately 5 Pa. The content was further subjected to reaction at the same temperature and pressure for 2 hrs. Thus, the reaction was complete.

The polymerization product was a white flexible, tough polymer having ηr=1.60, Tm=162.9° C., and Tc=128.2° C. The polymer composition was expressed by PA12/PCD/AA=48.0/49.2/2.8 (wt. %).

The polymerization product was then mixed with 1,000 ppm of an oxidation inhibitor (Tominox 917). The mixture was molded under compression at 230° C. and 10 MPa, to produce a polyamide elastomer film having a thickness of approximately 100 μm.

The polyimide elastomer film was subjected to measurements of $T_{0.9}$, coefficient of extension recovery, extension properties, and yellowness index, just after molding and after heat treatment. The measurement data are set forth in Table 1.

EXAMPLE 5

In a reaction vessel equipped with a stirrer, a nitrogen gas inlet, and a condensed water trap were placed 17.525 weight parts of the polyamide 12 oligomer having a carboxyl group at each end (Mn=1891.1, produced in Example 2), 6.271 weight parts of poly(1,6-hexanediol carbonate) [Mn=1010], 6.241 weight parts of poly(3-methyl-1,5-pentanediol carbonate) [Mn=2040], and 0.1 weight part of tetrabutyl titanate. The inner space of the vessel was purged using nitrogen gas. The content of the vessel was heated to 200° C. for one hour under the condition that a nitrogen gas was passed at a flow rate of 50 mL/min. The temperature of the content was then increased to 220° C. for 20 minutes, and the content was continuously heated for one hour. The inner pressure of the vessel was reduced for 10 minutes to reach approximately 8 Pa. Under the condition, the content was subjected to polymerization for 1.1 hrs. The inner space of the vessel was then heated and evacuated for 20 minutes to reach 230° C. and approximately 3 Pa. The content was further subjected to reaction at the same temperature and pressure for 2 hrs. Thus, the reaction was complete.

The polymerization product was a white flexible, tough polymer having ηr=1.87. The polymer composition was expressed by PA12/UH/UHP/AA=54.4/21.1/21.0/3.5 (wt. %, UH means a poly(1,6-hexanediol carbonate) unit, and UHP means a poly(3-methyl-1,5-pentanediol carbonate) unit).

The polymerization product was then mixed with 1,000 ppm of an oxidation inhibitor (Tominox 917). The mixture was molded under compression at 230° C. and 10 MPa, to produce a polyamide elastomer film having a thickness of approximately 100 μm.

The polyimide elastomer film was subjected to measurements of $T_{0.9}$, coefficient of extension recovery, extension properties, and yellowness index, just after molding and after heat treatment. The measurement data are set forth in Table 1.

EXAMPLE 6

In a reaction vessel equipped with a pressure gauge, a nitrogen gas inlet, and a pressure releasing outlet were placed 25.002 weight parts of laurolactam, 4.758 weight parts of dodecane diacid, and 5 weight parts of water. The inner space of the vessel was purged using nitrogen gas. The content of the vessel was heated to 270° C. for 10 hrs., to carry out polymerization. The inner pressure of the vessel was 2 MPa. The polymerization product was a polyamide 12 oligomer having a carboxyl group at each end: end group concentrations [COOH]=139.43×10$^{-5}$ eq/g and [NH$_2$]=0.13 eq/g, number average molecular weight (Mn)=1433.1.

In a reaction vessel equipped with a stirrer, a nitrogen gas inlet, and a condensed water trap were placed 17.403 weight parts of the polyamide 12 oligomer obtained above, 12.253 weight parts of polycarbonate diol (ETERNACOLL H100), and 0.1 weight part of tetrabutyl titanate. The inner space of the vessel was purged using nitrogen gas. The content of the vessel was heated to 200° C. for one hour under the condition that a nitrogen gas was passed at a flow rate of 50 mL/min. The temperature of the content was then increased to 220° C. for 30 minutes, and the content was continuously heated for one hour. The inner pressure of the vessel was reduced for 30 min. to reach approximately 8 Pa. Under the condition, the content was subjected to polymerization for 1.5 hrs. The inner space of the vessel was then heated and evacuated for 20 minutes to reach 230° C. and approximately 5 Pa. The content was further subjected to reaction at the same temperature and pressure for 3 hrs. Thus, the reaction was complete.

The polymerization product was a white flexible, tough polymer having ηr=1.78. The polymer composition was expressed by PA12/PCD/DDA=50.3/41.8/7.9 (wt. %, DDA means a dodecane diacid unit).

The polymerization product was then mixed with 1,000 ppm of an oxidation inhibitor (Tominox 917). The mixture was molded under compression at 230° C. and 10 MPa, to produce a polyamide elastomer film having a thickness of approximately 100 μm.

The polyimide elastomer film was subjected to measurements of $T_{0.9}$, coefficient of extension recovery, extension properties, and yellowness index, just after molding and after heat treatment. The measurement data are set forth in Table 1.

Comparison Example 1

In a reaction vessel equipped with a stirrer and a nitrogen gas inlet was placed 30.000 weight parts of 12-aminododecanoic acid. The inner space of the vessel was purged using nitrogen gas. The content of the vessel was heated to 190° C. for one hour under the condition that a nitrogen gas was passed at a flow rate of 50 mL/min. The temperature of the content was then increased to 250° C. for one hour, and the content was continuously heated at 250° C. for 5 hours. Thus, polymerization was complete. The polymerization product was polyamide 12 having ηr=2.18.

The polymerization product was then mixed with 1,000 ppm of an oxidation inhibitor (Tominox 917). The mixture was molded under compression at 230° C. and 10 MPa, to produce a polyamide elastomer film having a thickness of approximately 100 μm.

The polyimide elastomer film was subjected to measurements of $T_{0.9}$ and coefficient of extension recovery, just after molding. The measurement data are set forth in Table 1.

Comparison Example 2

In a reaction vessel equipped with a stirrer and a nitrogen gas inlet were placed 25.000 weight parts of 12-aminododecanoic acid and 4.723 weight parts of dodecane diacid. The inner space of the vessel was purged using nitrogen gas. The content of the vessel was heated to 200° C. for one hour under the condition that a nitrogen gas was passed at a flow rate of 50 mL/min. The temperature of the content was then increased to 240° C. for one hour, and the content was continuously heated at 240° C. for 4 hours. Thus, polymerization was complete. The polymerization product was a polyamide 12 oligomer having a carboxyl group at each end: end group concentrations [COOH]=148.37×10$^{-5}$ eq/g and [NH$_2$]=0 eq/g, number average molecular weight (Mn)=1398.0.

In a reaction vessel equipped with a stirrer and a nitrogen gas inlet were placed 17.406 weight parts of the polyamide 12 oligomer, 12.768 weight parts of polytetramethylene glycol (Mn=989), and 0.1 weight part of tetrabutyl titanate. The inner space of the vessel was purged using nitrogen gas. The content of the vessel was heated to 240° C. for 3 hrs. under the condition that a nitrogen gas was passed at a flow rate of 50 mL/min. The inner space of the vessel was then heated and evacuated for one hour to reach 270° C. and 400 Pa. The content was further subjected to reaction at the same temperature and pressure for 4 hours. Thus, reaction was complete.

The polymerization product was a white flexible, tough polymer having ηr=1.71, Tm=157.1° C., and Tc=122.3° C. The polymer composition was expressed by PA12/PTMG/DDA=54.9/40.6/4.5 (wt. %, PTMG means a polytetramethylene glycol unit).

The polymerization product was then mixed with 1,000 ppm of an oxidation inhibitor (Tominox 917). The mixture was molded under compression at 230° C. and 10 MPa, to produce a polyamide elastomer film having a thickness of approximately 100 μm.

The polyimide elastomer film was subjected to measurements of $T_{0.9}$, coefficient of extension recovery, extension properties, and yellowness index, just after molding and after heat treatment. The measurement data are set forth in Table 1.

Comparison Example 3

In a reaction vessel equipped with a stirrer and a nitrogen gas inlet were placed 30.005 weight parts of 12-aminododecanoic acid and 2.485 weight parts of adipic acid. The inner space of the vessel was purged using nitrogen gas. The content of the vessel was heated to 200° C. for one hour under the condition that a nitrogen gas was passed at a flow rate of 50 mL/min. The temperature of the content was then increased to 240° C. for one hour, and the content was continuously heated at 240° C. for 4 hours. Thus, polymerization was complete.

The polymerization product was a polyamide 12 oligomer having a carboxyl group at each end: end group concentrations [COOH]=113.41×10$^{-5}$ eq/g and [NH$_2$]=0 eg/g, number average molecular weight (Mn)=1763.5.

In a reaction vessel equipped with a stirrer and a nitrogen gas inlet were placed 19.600 weight parts of the polyamide 12 oligomer, 10.992 weight parts of polytetramethylene glycol (Mn=989), and 0.1 weight part of tetrabutyl titanate. The inner space of the vessel was purged using nitrogen gas. The content of the vessel was heated to 200° C. for 3 hrs. under the condition that a nitrogen gas was passed at a flow rate of 50 mL/min. The inner pressure was reduced to approximately 130 Pa, and the content was subjected to reaction for one hour. Subsequently, the inner pressure was reduced to approximately 10 Pa and the content was subjected to reaction for one hour. The content of the vessel was then heated for 20 minutes to reach 240° C. at approx. 10 Pa. The content was further subjected to reaction at the same temperature and pressure for 3 hours. Thus, reaction was complete.

The polymerization product was a white flexible, tough polymer having ηr=2.07, Tm=160.2° C., and Tc=125.3° C. The polymer composition was expressed by PA12/PTMG/AA=59.6/36.3/4.1 (wt. %).

The polymerization product was then mixed with 1,000 ppm of an oxidation inhibitor (Tominox 917). The mixture was molded under compression at 230° C. and 10 MPa, to produce a polyamide elastomer film having a thickness of approximately 100 $\mu$m.

The polyimide elastomer film was subjected to measurements of $T_{0.9}$, coefficient of extension recovery, extension properties, and yellowness index, just after molding and after heat treatment. The measurement data are set forth in Table 1.

Comparison Example 4

In a pressure-resistant stainless steel vessel (volume: 80 mL) equipped with a nitrogen gas inlet and a pressure gauge were placed 15.000 weight parts of polyamide produced from isophthalic acid and hexamethylene diamine, 2.113 weight parts of isophthalic acid, 12.887 weight parts of polycarbonate diol (ETERNACOLL H100), and 3.75 weight parts of water. The inner space of the vessel was purged using nitrogen gas. The content of the vessel was heated to 230° C. for 6 hrs., to carry out polymerization. The vessel was then placed in a water tank at room temperature. Thus, the polymerization was complete.

The polymerization product was opaque white viscous liquid.

In a reaction vessel equipped with a stirrer and a nitrogen gas inlet were placed 25.000 weight parts of the polymerization product and 0.025 weight part of tetrabutyl titanate. The inner space of the vessel was purged using nitrogen gas. The content of the vessel was heated to 210° C. for 3 hrs. under the condition that a nitrogen gas was passed at a flow rate of 50 mL/min. The inner pressure of the vessel was gradually reduced for one hour to reach approximately 30 Pa. Under the condition, the content was subjected to polymerization for 2 hrs. The inner space of the vessel was then heated and evacuated for 30 minutes to reach 230° C. and approximately 10 Pa. The content was further subjected to reaction at the same temperature and pressure for 2 hrs. Thus, the reaction was complete.

The polymerization product was a colorless, tough polymer having ηr=1.60.

The polymerization product was then mixed with 1,000 ppm of an oxidation inhibitor (Tominox 917). The mixture was molded under compression at 230° C. and 10 MPa, to produce a polyamide elastomer film having a thickness of approximately 100 $\mu$m.

The polyimide elastomer film was subjected to measurements of $T_{0.9}$, coefficient of extension recovery, extension properties, and yellowness index, just after molding and after heat treatment. The measurement data are set forth in Table 1.

Comparison Example 5

In a pressure-resistant stainless steel vessel (volume: 80 mL) equipped with a nitrogen gas inlet and a pressure gauge were placed 15.000 weight parts of polyamide produced from metaxylylene diamine and adipic acid (equimolar amounts), 1.891 weight parts of adipic acid, 13.109 weight parts of polycarbonate diol (ETERNACOLL H100), and 3.75 weight parts of water. The inner space of the vessel was purged using nitrogen gas. The content of the vessel was heated to 230° C. for 6 hrs., to carry out polymerization. The vessel was then placed in a water tank at room temperature. Thus, the polymerization was complete.

The polymerization product was opaque white viscous liquid.

In a reaction vessel equipped with a stirrer and a nitrogen gas inlet were placed 25.000 weight parts of the polymerization product and 0.02 weight part of tetrabutyl titanate. The inner space of the vessel was purged using nitrogen gas. The content of the vessel was heated to 210° C. for 3 hrs. under the condition that a nitrogen gas was passed at a flow rate of 50 mL/min. The inner pressure of the vessel was gradually reduced for one hour to reach approximately 30 Pa. Under the condition, the content was subjected to polymerization for 2 hrs. The inner space of the vessel was then heated and evacuated for 30 minutes to reach 230° C. and approximately 10 Pa. The content was further subjected to reaction at the same temperature and pressure for 2 hrs. Thus, the reaction was complete.

The polymerization product was a colorless, tough polymer having ηr=1.71.

The polymerization product was then mixed with 1,000 ppm of an oxidation inhibitor (Tominox 917). The mixture was molded under compression at 230° C. and 10 MPa, to produce a polyamide elastomer film having a thickness of approximately 100 $\mu$m.

The polyimide elastomer film was subjected to measurements of $T_{0.9}$, coefficient of extension recovery, extension properties, and yellowness index, just after molding and after heat treatment. The measurement data are set forth in Table 1.

TABLE 1

| | Relax. $t_{0.9}$ (s) | Exten. Recovery (%) | Elast. (MPa) | Break. (MPa) | Exten. (B) (%) | Yellow Index |
|---|---|---|---|---|---|---|
| Example | | | | | | |
| 1 | 5.5/4.7 | 89/87 | 113/118 | 8.9/9.0 | 570/510 | 6/20/30 |
| 2 | 3.9/3.1 | 86/86 | 198/211 | 13.8/13.5 | 510/460 | 5/20/30 |
| 3 | 5.2/4.5 | 83/83 | 122/129 | 10.5/11.1 | 700/630 | 6/15/25 |
| 4 | 4.0/3.5 | 83/80 | 101/110 | 8.0/8.1 | 600/550 | 5/20/35 |
| 5 | 3.6/3.0 | 85/81 | 104/113 | 9.8/9.5 | 600/530 | 8/20/30 |
| 6 | 4.8/4.1 | 88/86 | 118/126 | 9.1/8.9 | 650/590 | 6/20/30 |
| Comparison Example | | | | | | |
| 1 | 0.48/— | 73/— | —/— | —/— | —/— | —/—/— |
| 2 | 10.5/5.0 | 92/87 | 102/110 | 8.2/8.0 | 620/490 | 11/40/120 |

TABLE 1-continued

| | Exten. | Extension Properties | | | | |
|---|---|---|---|---|---|---|
| | Relax. $t_{0.9}$ (s) | Re-covery (%) | Elast. (MPa) | Break. (MPa) | Exten. (B) (%) | Yellow Index |
| 3 | 8.1/4.5 | 91/88 | 123/125 | 10.2/10.3 | 680/620 | 10/40/105 |
| 4 | 1.9/— | 75/— | 210/— | 13.2/— | 110/— | —/—/— |
| 5 | 2.3/— | 77/— | 220/— | 14.1/— | 130/— | —/—/— |

Remarks:
"Relax. $t_{0.9}$ (s)" means "stress relaxation $t_{0.9}$ (in terms of second)". The left numeral is a value measured just after molding, and the right numeral is a value measured after 30 day storage at 100° C.
"Exten. Recovery (%)" means "coefficient of extension recovery in term of %". The left numeral is a value measured just after molding, and the right numeral is a value measured after 30 day storage at 100° C.
"Elast. (MPa)" means "modulus of elasticity in term of MPa". The left numeral is a value measured just after molding, and the right numeral is a value measured after 30 day storage at 100° C.
"Break. (MPa)" means "tensile stress at breakdown point in term of MPa". The left numeral is a value measured just after molding, and the right numeral is a value measured after 30 day storage at 100° C.
"Exten. (B) (%)" means "breakdown extension in term of %". The left numeral is a value measured just after molding, and the right numeral is a value measured after 30 day storage at 100° C.
In the column of Yellowness index (YI), the left numeral is a value measured just after molding, the center numeral is a value measured after 60 day storage at 50° C., and the right numeral is a value measured after 60 day storage at 80° C.

The data set forth in Table 1, the polyamide elastomers according to the invention (Examples 1 to 5) show an appropriate stress relaxation, a high extension recovery, a high breakdown extension, a low yellowness index, and high heat resistance. Accordingly, the polyamide elastomer of the invention is satisfactorily employable specifically for producing various flexible molded products in the industrial use.

What is claimed is:

1. Polyamide elastomer comprising units derived from polyamide-forming monomers having no divalent aromatic group, units derived from polycarbonate diols, and units derived from dicarboxylic acids,
    wherein the polyamide-forming monomers are represented by the following formula (1) or (4), the polycarbonate diols are represented by the following formula (2), and the dicarboxylic acids are represented by the following formula (3):

$$H_2N-R^1-COOH \quad (1)$$

(4)

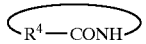

in which $R^1$ is an aliphatic hydrocarbon chain having 2 to 20 carbon atoms, and $R^4$ is an aliphatic hydrocarbon chain having 3 to 20 carbon atoms.

$$HO-[-R^2-OCOO-]_n-R^2-OH \quad (2)$$

in which $R^2$ is an aliphatic hydrocarbon chain having 2 to 12 carbon atoms or a molecular chain comprising an alicyclic group having 5 to 12 carbon atoms and an aliphatic hydrocarbon group having 2 to 12 carbon atoms, and n is a number of 2 to 60, and $$HOOC-(R^3)_m COOH \quad (3)$$

in which $R^3$ is an aliphatic hydrocarbon chain having 1 to 25 carbon atoms or a molecular chain comprising an alicyclic group having 5 to 20 carbon atoms and an aliphatic hydrocarbon group having 1 to 25 carbon atoms, and m is 0 or 1.

2. The polyamide elastomer of claim 1, wherein the elastomer contains the units derived from polyamide-forming monomers in an amount of 15 to 90 weight %.

3. The polyamide elastomer of claim 1, wherein the elastomer contains the units derived from polycarbonate diols in an amount of 15 to 90 weight.

4. Polyamide elastomer comprising units derived from aliphatic polyamides having a carboxylic acid group at each end thereof, and units derived from polycarbonate diols,
    wherein the polyamide having a carboxylic acid group at each end thereof is prepared by the reaction between a monomer represented by the following formula (1) or (4) and a dicarboxylic acid represented by the following formula (3), and the polycarbonate diols are represented by the following formula (2):

$$H_2N-R^1-COOH \quad (1)$$

(4)

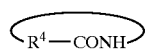

in which $R^1$ is an aliphatic hydrocarbon chain having 2 to 20 carbon, and $R^4$ is an aliphatic hydrocarbon chain having 3 to 20 carbon atoms, $$HOOC-(R^3)_m COOH \quad (3)$$

in which $R^3$ is an aliphatic hydrocarbon chain having 1 to 25 carbon atoms or a molecular chain comprising an alicyclic group having 5 to 20 carbon atoms and an aliphatic hydrocarbon group having 1 to 25 carbon atoms, and m is 0 or 1, $$HO-[-R^2-OCOO-]_n-R^2-OH \quad (2)$$

in which $R^2$ is an aliphatic hydrocarbon chain having 2 to 12 carbon atoms or a molecular chain comprising an alicyclic group having 5 to 12 carbon atoms and an aliphatic hydrocarbon group having 2 to 12 carbon atoms, and n is a number of 2 to 60.

5. The polyamide elastomer of claim 4, wherein the elastomer contains the units derived from polyamide having a carboxylic acid group at each end thereof in an amount of 15 to 90 weight %.

6. The polyamide elastomer of claim 4, wherein the elastomer contains the units derived from polycarbonate diols in an amount of 15 to 90 weight %.

7. Polyamide elastomer comprising aliphatic polyamide units in an amount of 15 to 95 weight %, polycarbonate dial units, and dicarboxylic acid units,
    wherein the polyamide units, having a carboxylic acid group at each end thereof, are prepared by the reaction between a monomer represented by the following formula (1) or (4) and a dicarboxylic acid represented by the following formula (3), and the polycarbonate diol units are derived from compounds represented by the following formula (2):

$$H_2N-R^1-COOH \quad (1)$$

in which $R^1$ is an aliphatic hydrocarbon chain having 2 to 20 carbon atoms, and $R^4$ is an aliphatic hydrocarbon chain having 3 to 20 carbon atoms,:

$$HOOC(R^3)_m\text{—}COOH \quad (3)$$

in which $R^3$ is an aliphatic hydrocarbon chain having 1 to 25 carbon atoms or a molecular chain comprising an alicyclic group having 5 to 20 carbon atoms and an aliphatic hydrocarbon group having 1 to 25 carbon atoms, and m is 0 or 1, and $$HO\text{—}[\text{—}R^2\text{—}OCOO\text{—}]_n\text{—}R^2\text{—}OH \quad (2)$$

in which $R^2$ is an aliphatic hydrocarbon chain having 2 to 12 carbon atoms or a molecular chain comprising an alicyclic group having 5 to 12 carbon atoms and an aliphatic hydrocarbon group having 2 to 12 carbon atoms, and n is a number of 2 to 60.

* * * * *